INVENTOR.
CORNELIUS J. CALLAGHAN
BY
MAHONEY, MILLER & RAMBO
BY
ATTORNEYS

April 11, 1967  C. J. CALLAGHAN  3,312,985
INVALID BED WITH LIFTING MECHANISM
Filed July 5, 1966  13 Sheets-Sheet 2
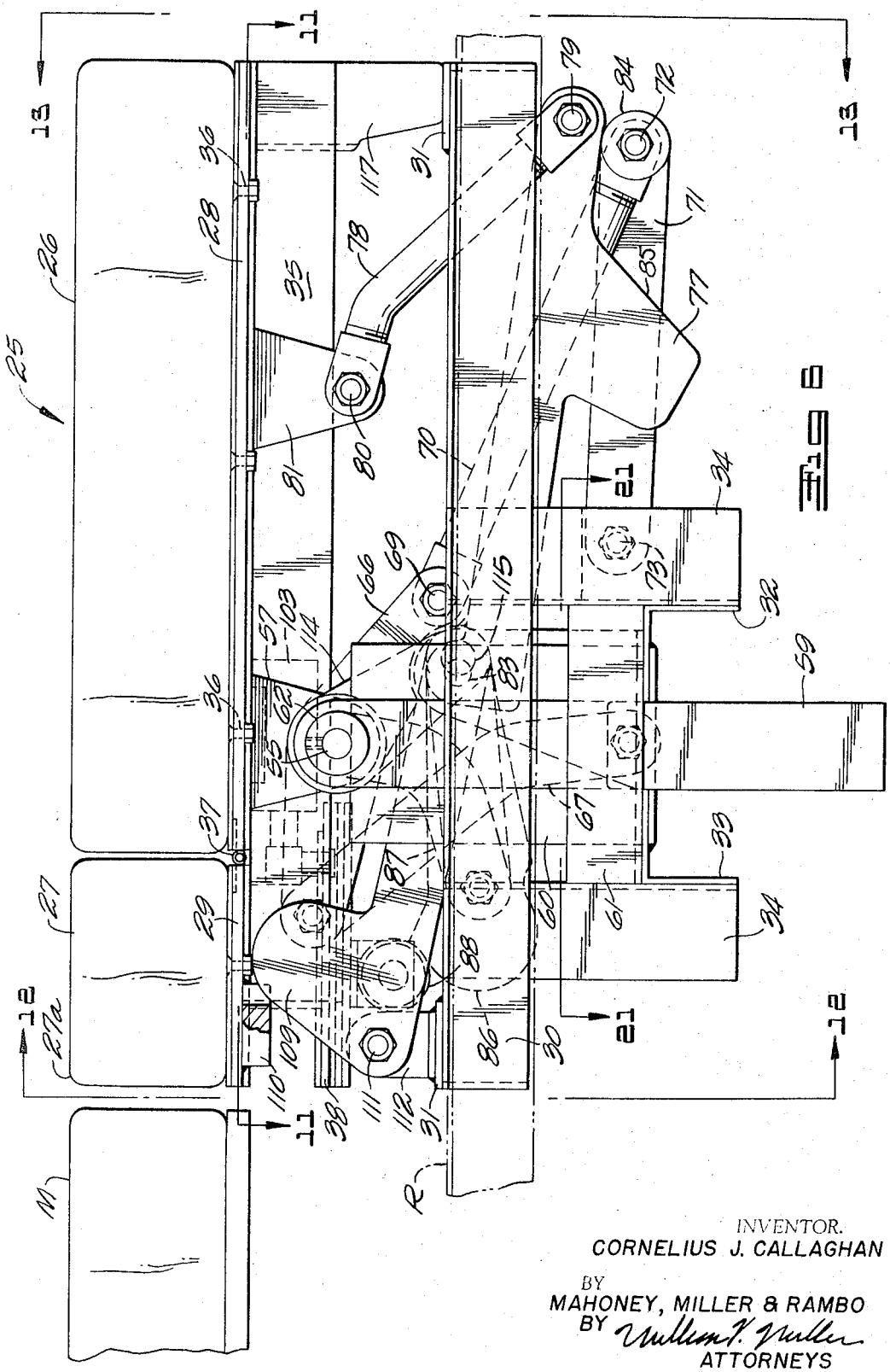
INVENTOR.
CORNELIUS J. CALLAGHAN
BY
MAHONEY, MILLER & RAMBO
BY
ATTORNEYS

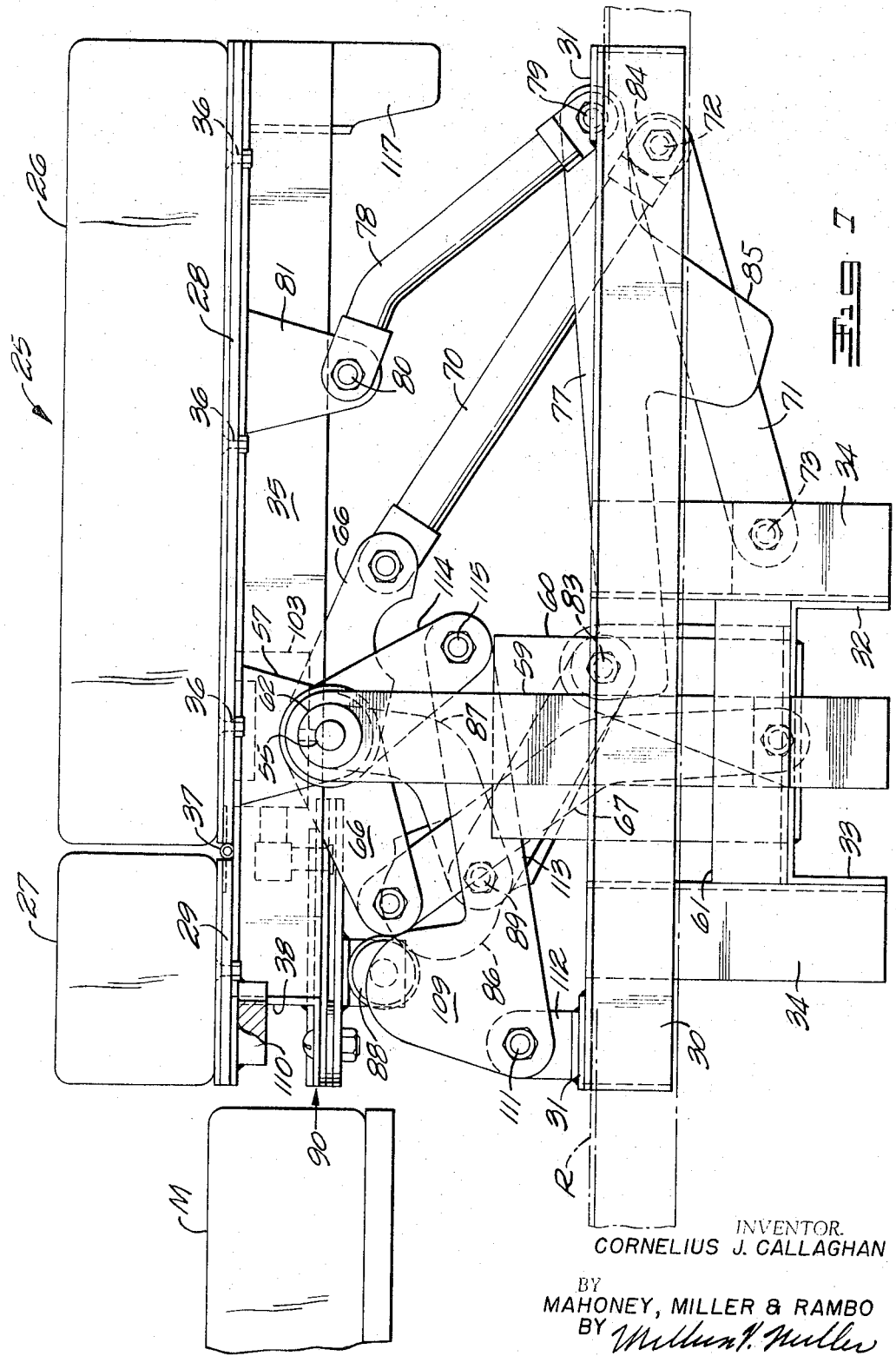

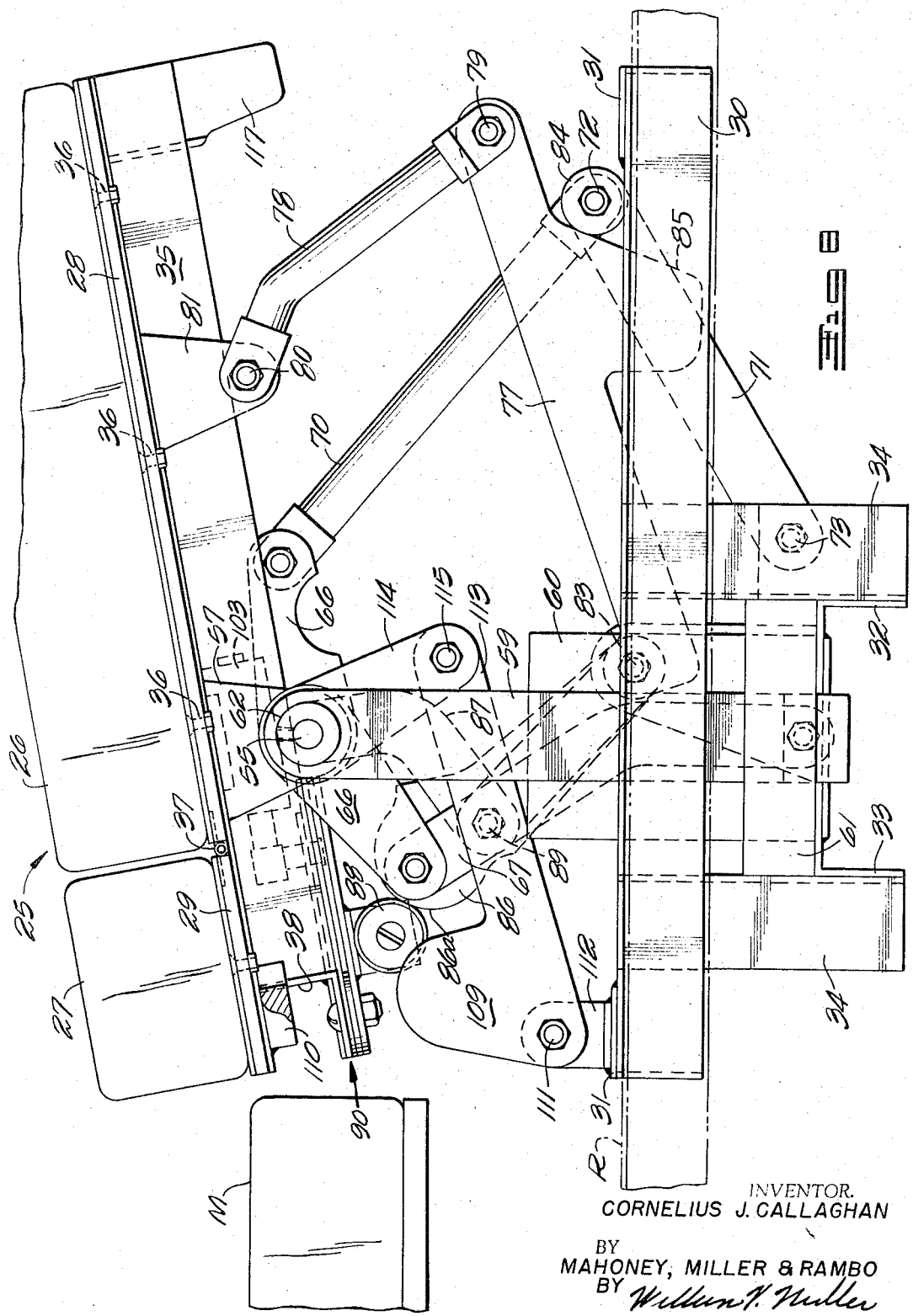

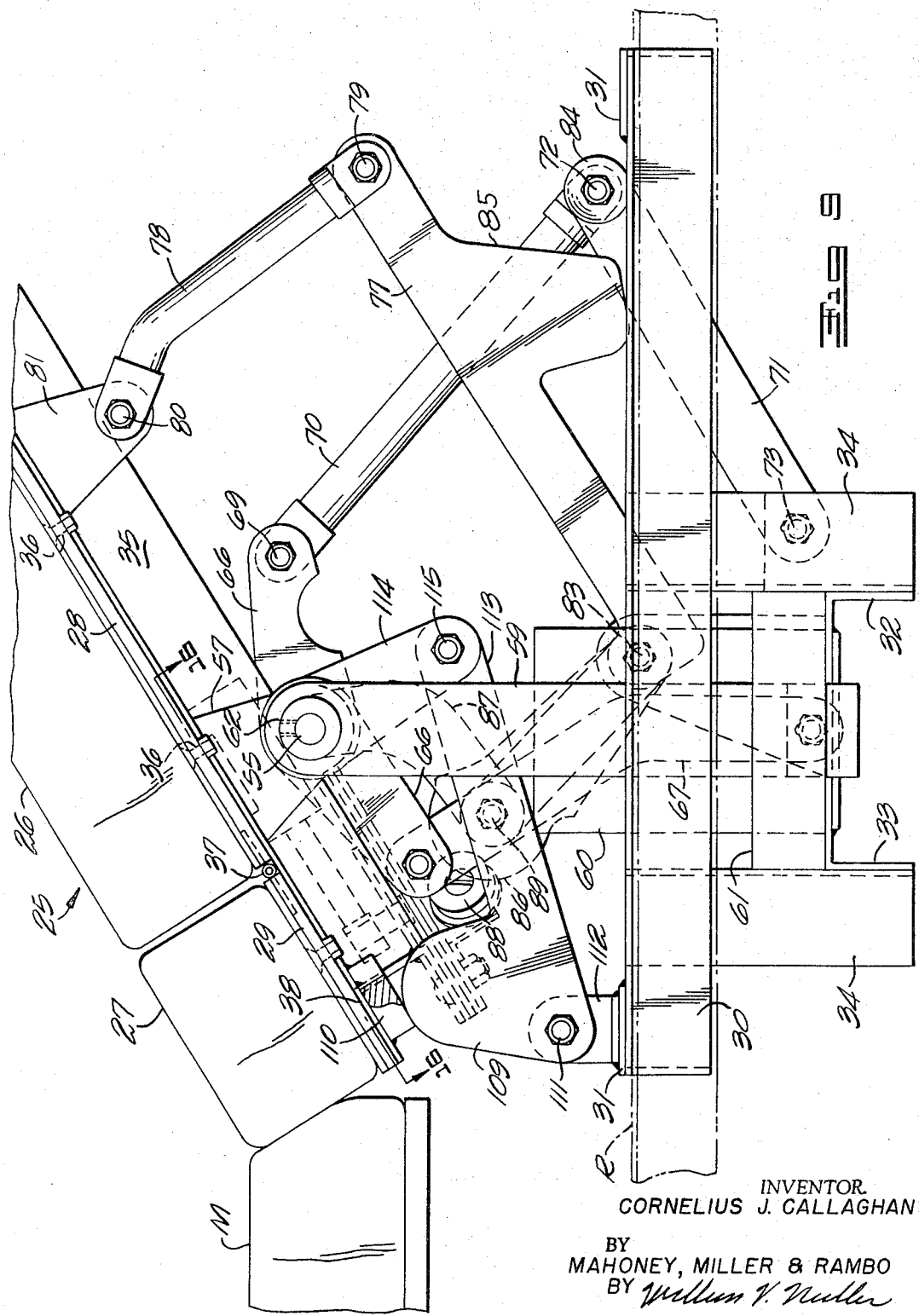

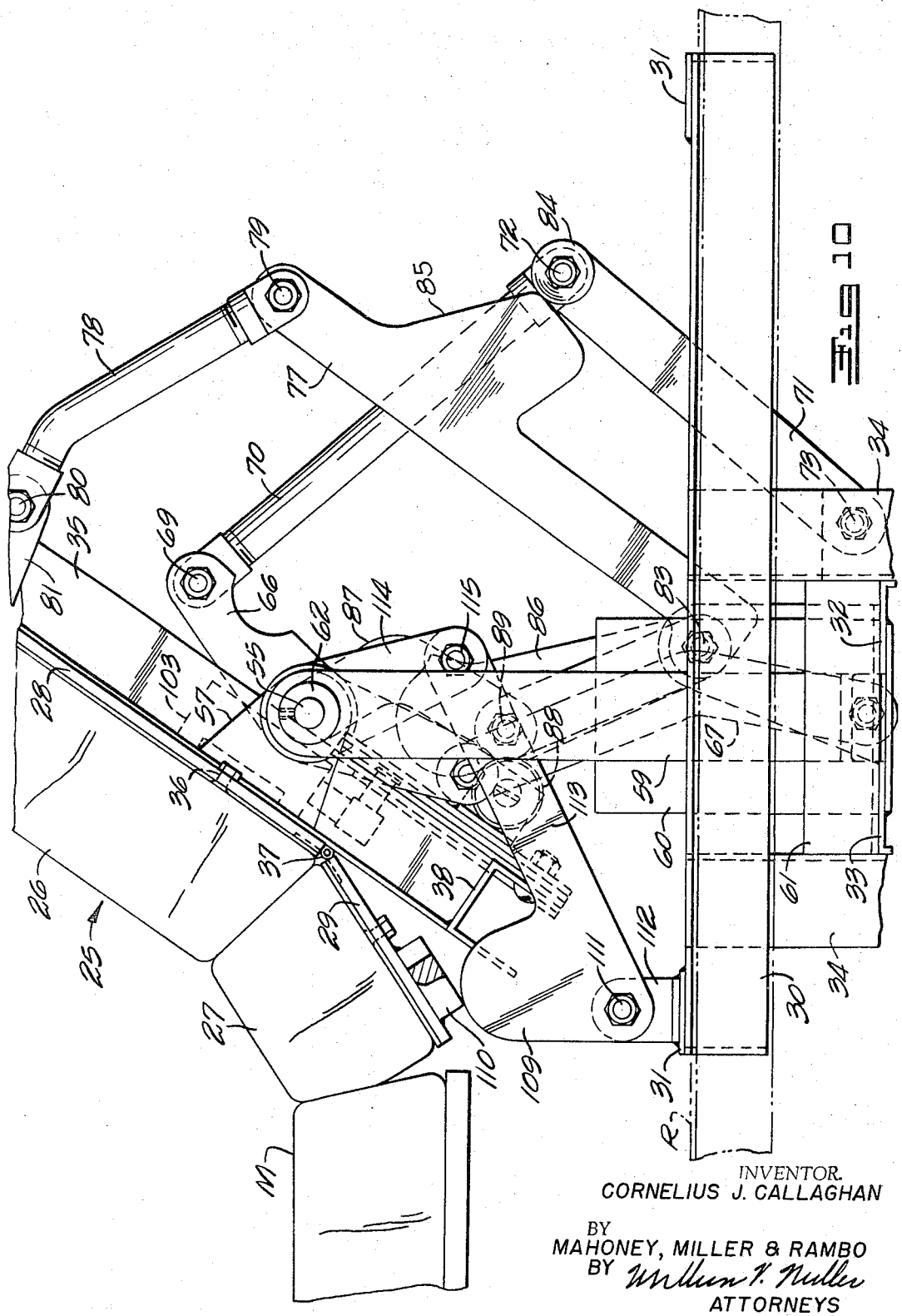

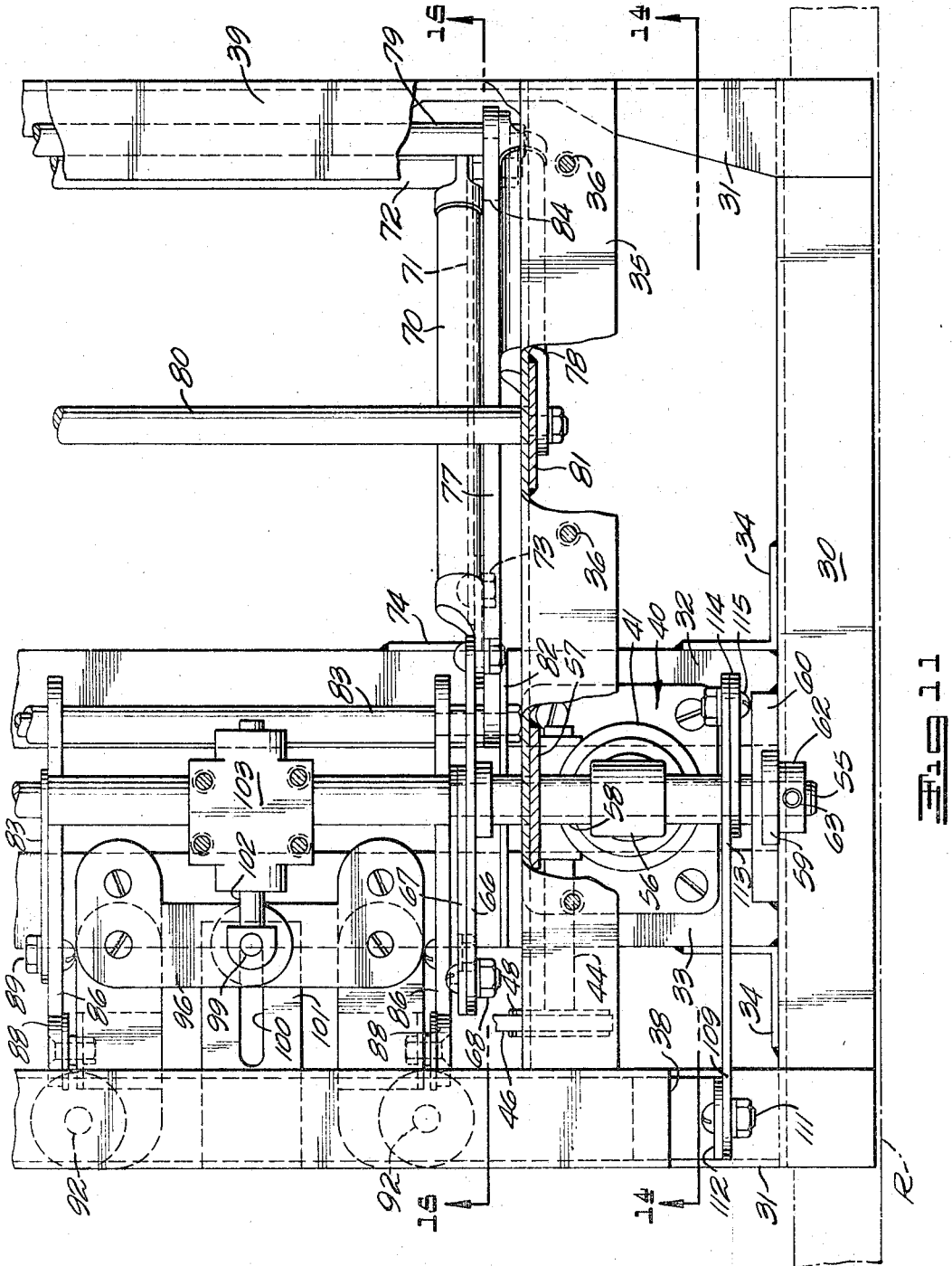

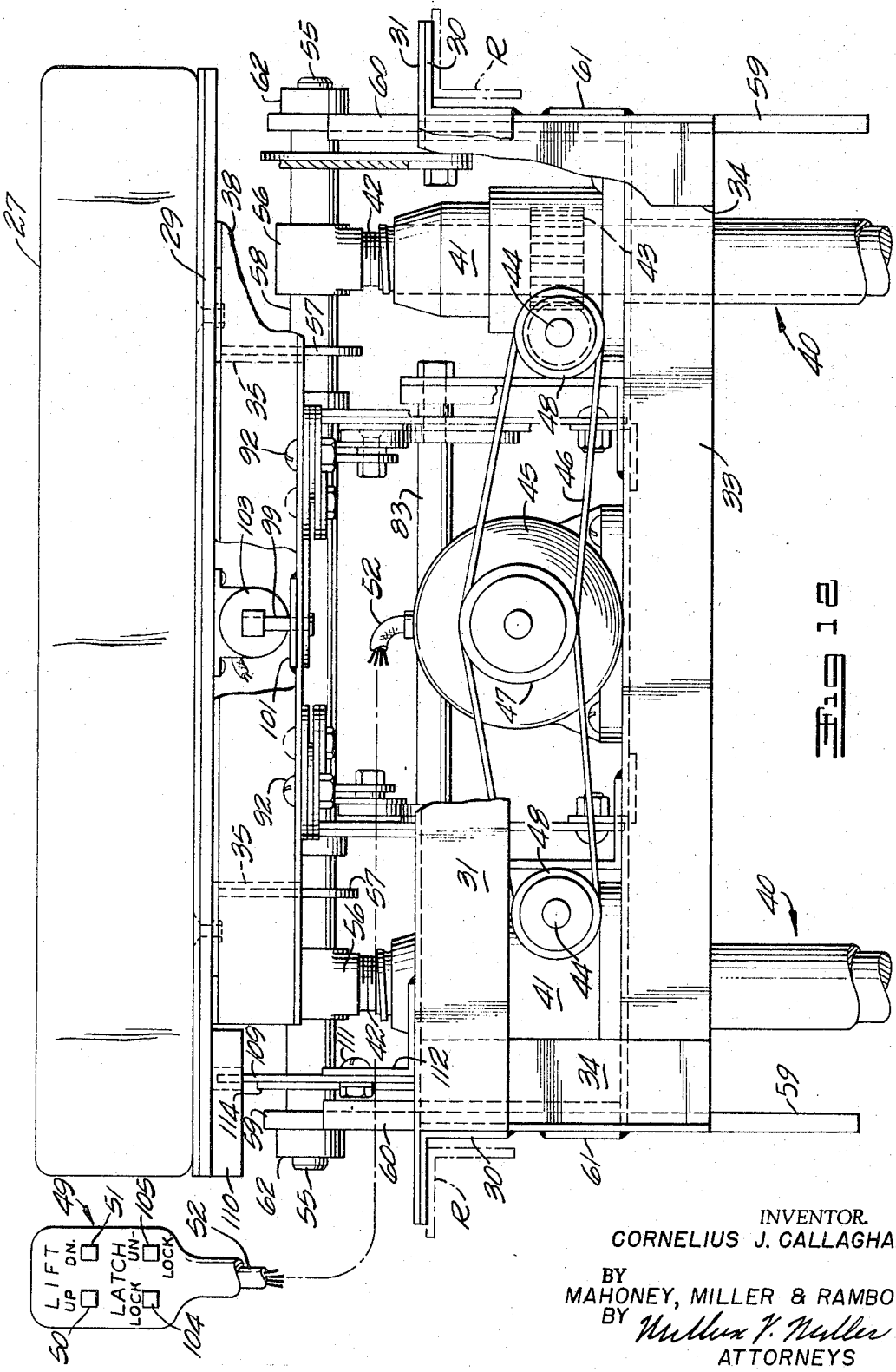

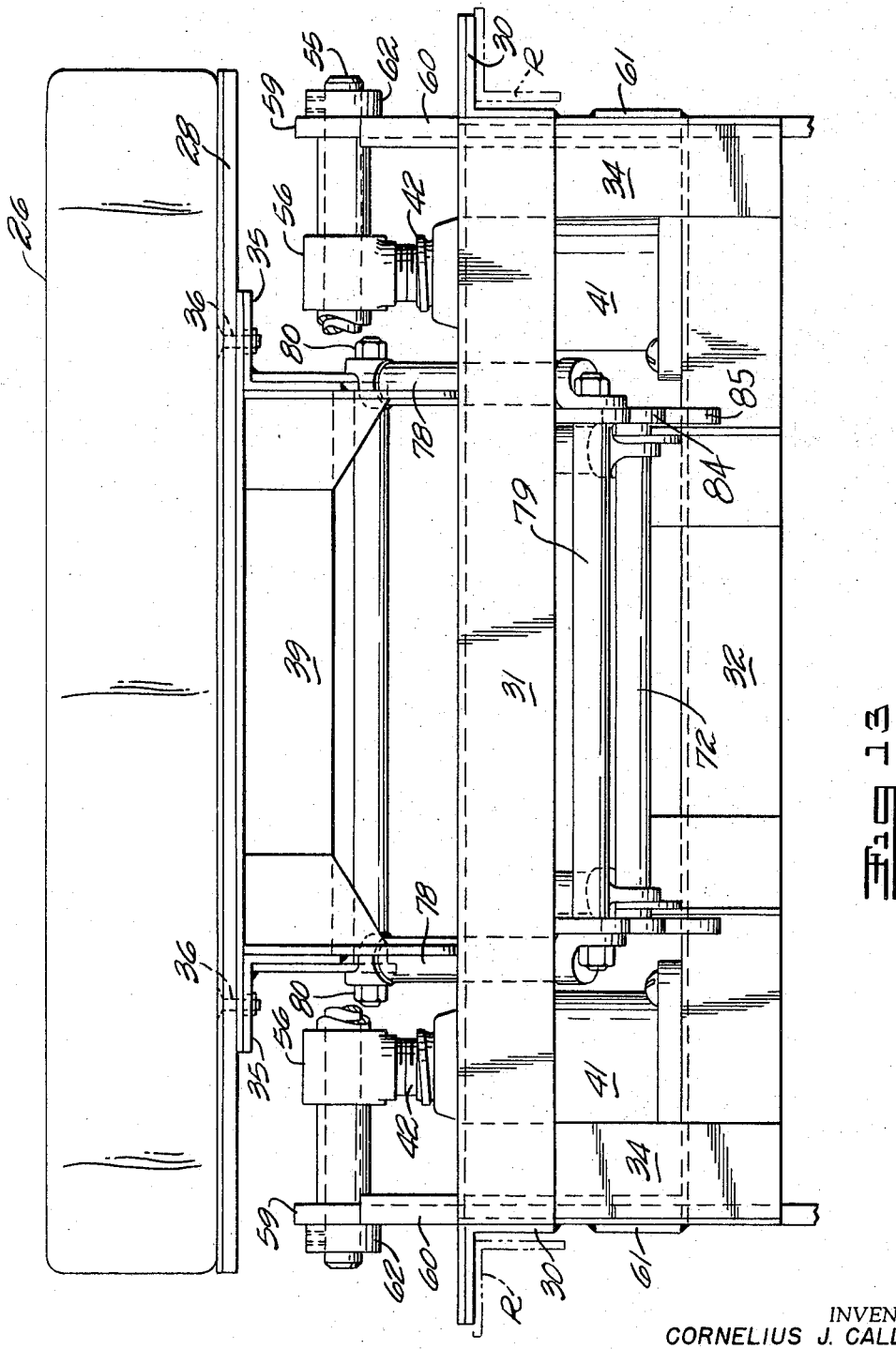

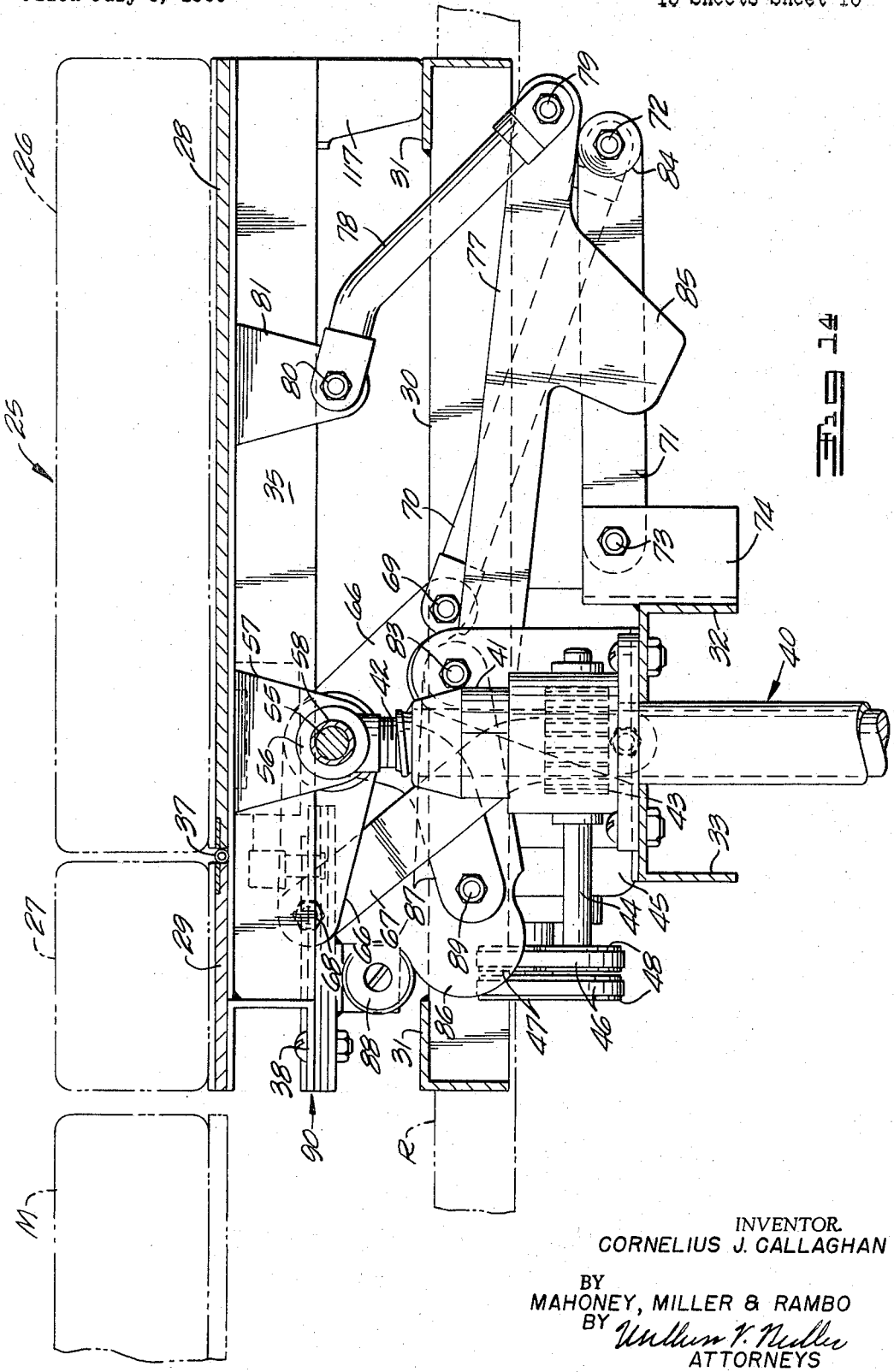

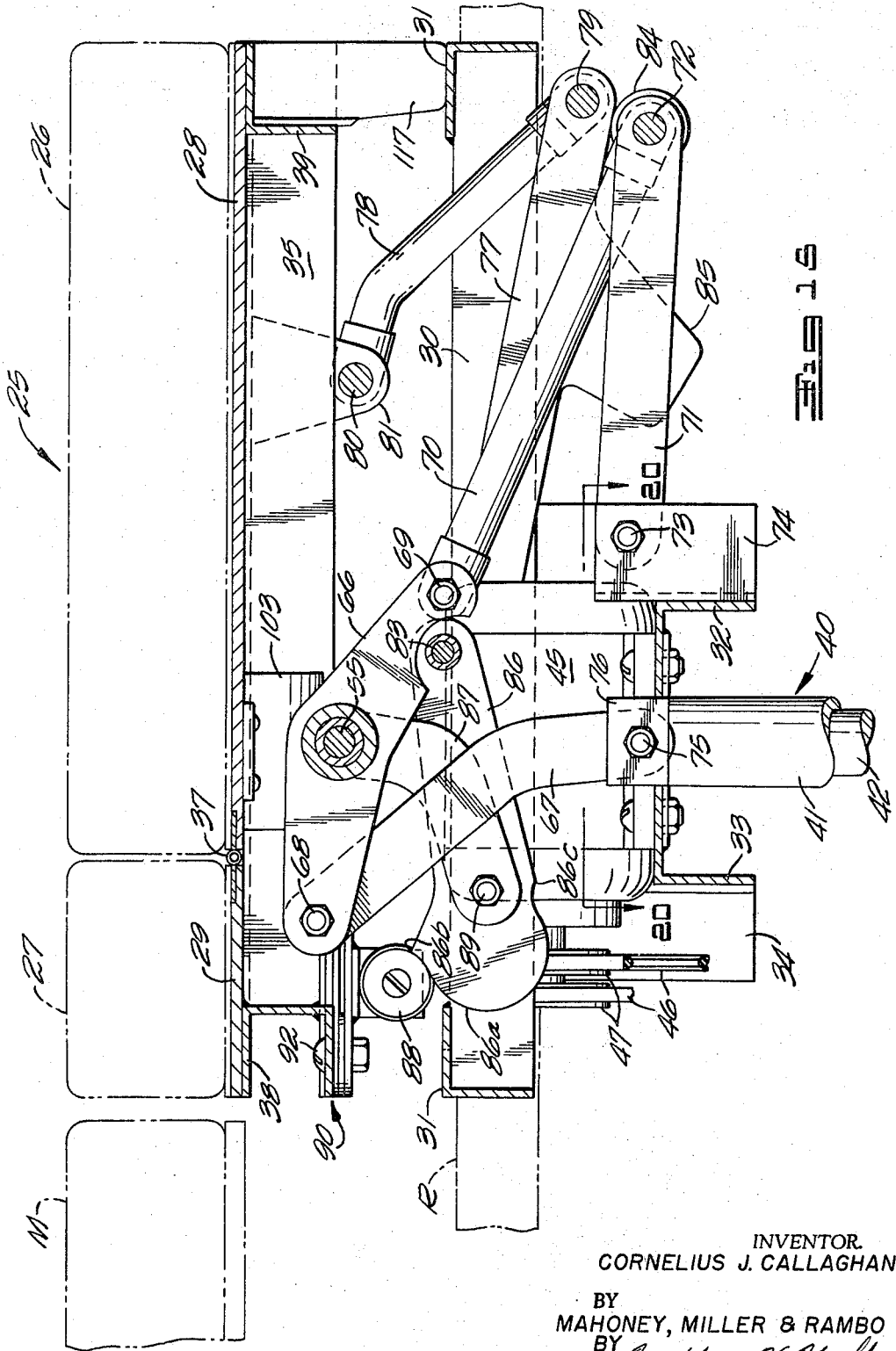

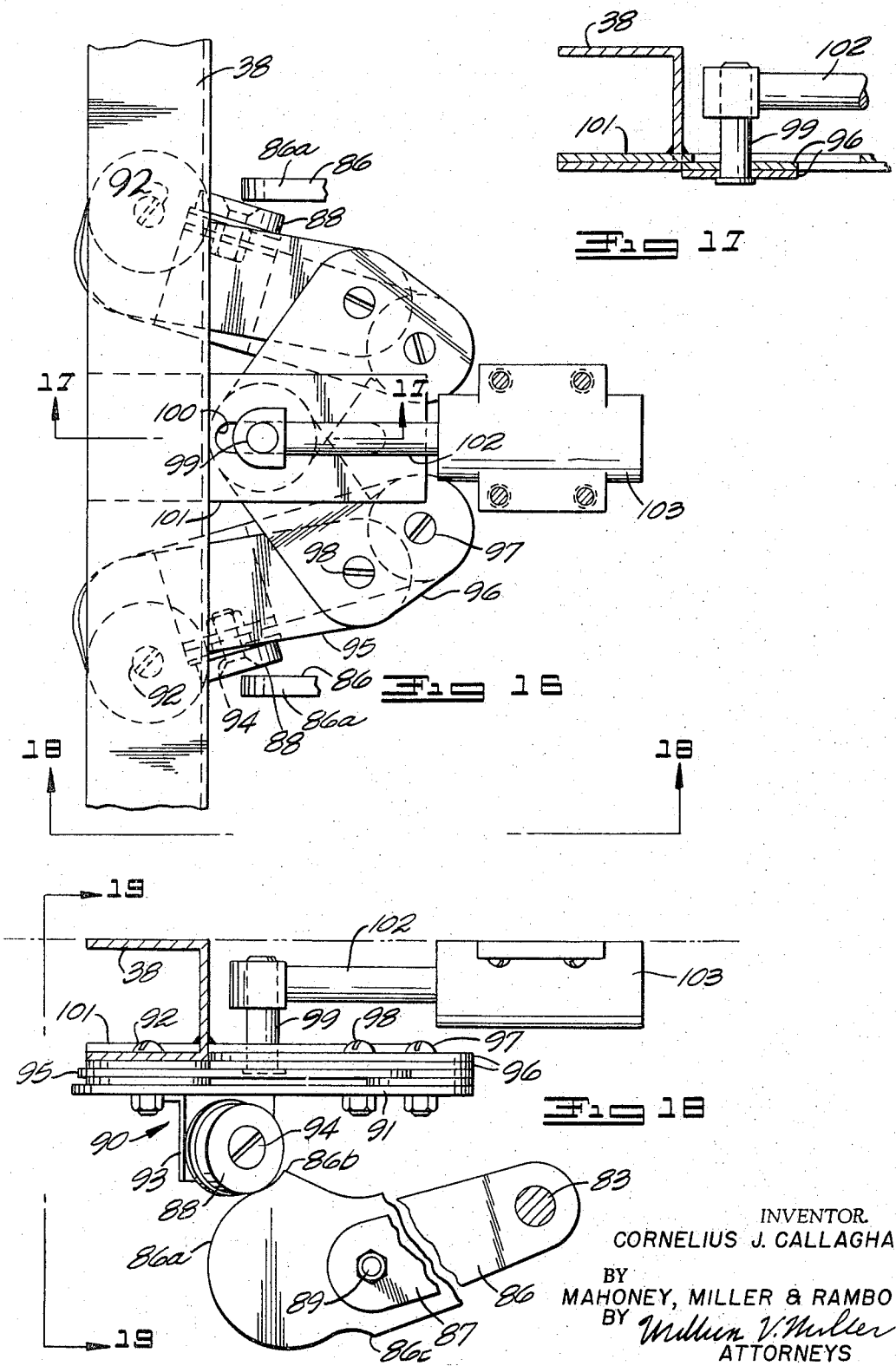

April 11, 1967 C. J. CALLAGHAN 3,312,985
INVALID BED WITH LIFTING MECHANISM
Filed July 5, 1966 13 Sheets-Sheet 13

INVENTOR.
CORNELIUS J. CALLAGHAN

BY
MAHONEY, MILLER & RAMBO
BY
ATTORNEYS

United States Patent Office 3,312,985
Patented Apr. 11, 1967

3,312,985
INVALID BED WITH LIFTING MECHANISM
Cornelius J. Callaghan, Columbus, Ohio, assignor to Invalift Corporation, Columbus, Ohio, a corporation of Ohio
Filed July 5, 1966, Ser. No. 562,839
14 Claims. (Cl. 5—66)

This application is a continuation-in-part of my copending application, Ser. No. 454,870, filed May 11, 1965, now abandoned.

This invention relates, in general, to an invalid bed of the type which incorporates apparatus facilitating the movement and positioning of a patient. It relates, more specifically, to a novel bed-lift apparatus adapted to be incorporated in a bed structure to facilitate movement of the patient by an attendant or to provide assistance for self-movement by the patient.

The care of patients confined or restricted to a bed is a difficult task requiring a relatively large portion of the time of attendants assigned to their care. During the course of such care, it frequently becomes necessary for the attendant to move or reposition the patient on the bed to permit performance of such tasks as changing the bed linen or bathing the patient or to permit utilization of a bedpan. In the case of adult patients, the movement which is necessary may require a large degree of physical exertion on the part of the attendant and may be injurious to the attendant unless two or more attendants are assigned or are available for each patient. Strain or movement with respect to the patient as a consequence of such movement may also be undesirable, particularly in the case of bone fractures or heart conditons. Hospital beds constructed in accordance with prior art are not adapted to lifting of or assisting in the movement of the patient and serve only as an adjustable-type bedrest. Although the prior art hospital beds may be provided with a motorized actuator to facilitate their operation and permit actuation by the patient, such a mechanism does not provide the desired capability of performing the lifting function. Heretofore, the handling of patients in accordance with prior practice and with prior art apparatus has represented a substantial cost factor in the operation of a hopsital and has prevented utilization of home care where the available attendants are not physically capable of manually performing the necessary patient handling, as in the case of elderly persons. In addition to the inability of the prior art invalid beds, including those provided with a motorized actuator, to perform the lifting function, such beds are relatively costly and the economic factor is thus another disadvantage to at-home patient care where such care would be medically feasible. Where the availability of attendants capable of performing the handling is limited or non-existent, other auxiliary lifting apparatus must be provided which further increases hospital or home care costs.

It is, therefore, the primary object of this invention to provide an invalid bed having a novel bed-lift apparatus which greatly facilitates the handling and positioning of the patient.

Another important object of this invention is to provide a novel bed-lift apparatus which may be readily incorporated in existing bed constructions for facilitating the handling and positioning of the patient.

It is a further object of this invention to provide a lift apparatus for a bed structure and which may be actuated by the patient for assistance in positioning himself.

It is another object of this invention to provide an invalid bed-lift apparatus which is capable of selectively effecting vertical lifting of the patient or placement of the patient in a reclined sitting position or a combination of the two operations.

It is also an object of this invention to provide an invalid bed-lift apparatus which is of relatively low cost construction and which is simple to operate.

These and other objects and advantages of this invention will be readily apparent from the following detailed description of an embodiment thereof and the accompanying drawings.

In the drawings:

FIGURE 1 is a diagrammatic view similar to FIGURE 1 but showing the apparatus actuated for vertical displacement or lifting of an invalid in a horizontal plane.

FIGURE 6 is an enlarged, longitudinal side elevational view of the apparatus in the repose position of FIGURE 1.

FIGURE 7 is an enlarged, longitudinal side elevational view of the apparatus actuated for vertical displacement to an elevated, horizontal position as shown in FIGURE 2.

FIGURE 8 is an enlarged, longitudinal side elevational view of the apparatus actuated for vertical displacement to the inclined, elevated position shown in FIGURE 3.

FIGURE 9 is an enlarged, longitudinal side elevational view of the apparatus actuated as shown in FIGURE 4 to the same degree as in FIGURE 8 but with the cam mechanism inoperative to permit relatively greater inclination.

FIGURE 10 is an enlarged, longitudinal side elevational view of the apparatus actuated as in FIGURE 5 to a maximum inclined position.

FIGURE 11 is a fragmentary, horizontal sectional view taken along line 11—11 of FIGURE 6.

FIGURE 12 is an end elevational view taken along line 12—12 of FIGURE 6 with portions of several elements broken away.

FIGURE 13 is an end elevational view taken along line 13—13 of FIGURE 6.

FIGURE 14 is a vertical, elevational view taken along line 14—14 of FIGURE 11.

FIGURE 15 is a vertical, elevational view taken along line 15—15 of FIGURE 11.

FIGURE 16 is an enlarged, fragmentary sectional view taken along line 16—16 of FIGURE 9 showing the cam follower mechanism.

FIGURE 17 is a vertical, sectional view taken along line 17—17 of FIGURE 16.

FIGURE 18 is a vertical, sectional view taken along line 18—18 of FIGURE 16.

Figure 1:
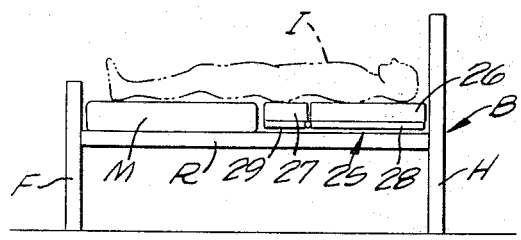
FIGURE 1 is a diagrammatic, side elevational view of an invalid bed provided with an invalid bed-lift apparatus embodying this invention with the apparatus in a repose position.

Having reference to the drawings, a typical application of the invalid bed-lift apparatus of this invention is diagrammatically illustrated in FIGURES 1, 2, 3, 4, and 5, with an invalid I being shown in broken lines to more clearly demonstrate perspective and function of the apparatus. In each of these figures, a bed structure B of well known configuration is illustrated and forms the basic support structure for the invalid bed-lift apparatus. This typical bed structure B includes the upright footboard F and headboard H which are interconnected by a pair of longitudinally extending side rails R. The side rails R are rigidly secured at each end to the respective head or footboard, H or F, and are disposed to extend horizontally therebetween in laterally spaced relationship. Carried by the side rails R is a first mattress portion M which occupies substantially the lower one-half of the bed and which may be referred to as the foot section. This section terminates at substantially the mid point of the bed and is primarily utilized in support of the legs of the invalid I. A suitable supporting platform (not shown) is provided for the first mattress portion M and would be secured or attached to the rails R and maintain the associated mattress in the desired horizontal position. In the illustrated embodiment of the invention, the foot section M is not designed for articulated movement such as in the conventional type invalid or hospital beds. However, if so desired, this section may be of the well known articulated type to provide jointed movement in supporting the invalid's legs in an angular position.

Completing the invalid supporting mattress structure is a second mattress portion 25 may be referred to as the head section and which supports the head and trunk of the invalid I. In accordance with this invention, the head section 25 is of articulated construction comprising a main section 26 and an auxiliary section 27. The support and auxiliary sections 26 and 27 are supported by and are adapted to be secured to the respective sections 28 and 29 of a supporting platform. The platform sections 28 and 29 are hinged together at their adjacent edges for swinging movement about a horizontal axis extending transversely of the bed structure and thus permitting relative swinging movement of the main and auxiliary mattress sections 26 and 27.

The apparatus of this invention is designed to facilitate movement of the invalid through selective displacement of the upper body portion of the invalid I by selective actuation of the apparatus to position the head section 25 in a desired position such as is diagrammatically illustrated in FIGURES 1–5. An actuating means, not shown in FIGURES 1, 2 or 3, interconnects the mattress supporting platform sections 28 and 29 with the longitudinally extending bed support rails R and may be selectively operated to effect the desired movement. This actuating means is shown in detail in subsequent figures of the drawings and is described in detail hereinafter.

Figure 4:
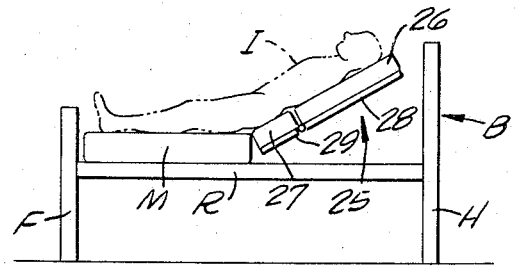
FIGURE 4 is a diagrammatic view similar to FIGURE 1 showing the apparatus actuated to a moderately inclined position.
Figure 5:
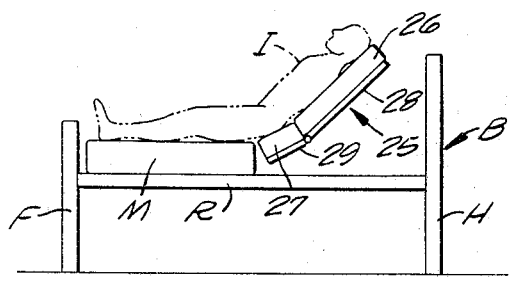
FIGURE 5 is a diagrammatic view similar to FIGURE 1 showing the apparatus actuated to a maximum inclined position.

In the normal repose position, as shown in FIGURE 1, the head section 25 will be arranged in a substantially horizontal plane with the upper surface of the mattress sections 26 and 27 being contiguous to the upper surface of the foot section mattress M. Thus, the invalid I is uniformly supported in a horizontal position as may be required in cases where rest and sleep are desired. In instances where movement of the invalid to a reclined sitting position is permitted and desirable, the head section 25 may be displaced to a desired inclined position by the actuating means, as shown in FIGURES 4 and 5. In a reclined position, the invalid I would be substantially supported by the head section 25 at the upper portion of his body while the legs are supported by the foot section M which remains horizontally disposed. A reclined position provides comfort for the invalid for reading or other activities and greatly facilitates the feeding process for either a self-feeding operation or where an attendant must perform the feeding and permits the bed linens covering the head section to be readily changed as the invalid may be easily supported away from the mattress.

Figure 2:
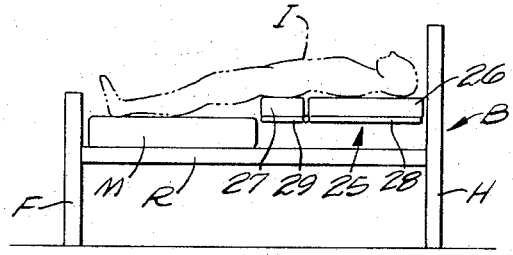
Figure 3:
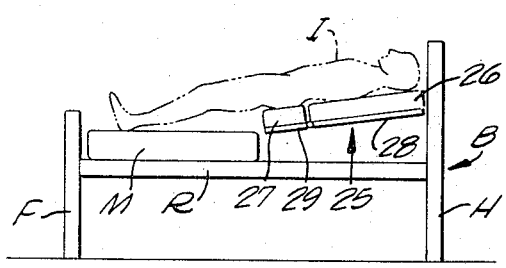
FIGURE 3 is a diagrammatic view similar to FIGURE 1 showing the apparatus actuated for vertical displacement or lifting of an invalid to an inclined, elevated position.

The lifting function of the apparatus of this invention is illustrated in FIGURES 2 and 3. For this function, the actuating means may be operated to vertically displace the main and auxiliary mattress sections 26 and 27 to a horizontal, elevated position as shown in FIGURE 2. In this position, the upper supporting surface of the auxiliary mattress section 27 will be at a relatively greater elevation than the surface of the mattress foot section M. As shown, the head and shoulders of the invalid will thus be supported by the main section 26 while the buttocks are supported by the auxiliary section 27. Combined with the vertical, elevating operation, the head section 25 may also be swung to an inclined configuration to position the upper body portion of the invalid I in an inclined relationship to the foot section M, as is shown in FIGURE 3. As can be readily seen from the configuration of the apparatus in FIGURES 2 and 3, the invalid I will be supported in a substantially flat plane with only the feet being in contact with the mattress of the foot section M. This vertical, elevating operation is accomplished without materially subjecting the invalid to movement or strain. By elevating the invalid, as indicated in FIGURES 2 or 3, an attendant may readily accomplish the linen changing of the mattress section. For this operation, the head section 25 would first be elevated as in FIGURES 2 or 3 and the upper portion of a sheet pulled downwardly to the center of the back. A pillow may then be inserted beneath the invalid's legs and supported on the foot section M adjacent the head section 25 and the head section lowered sufficiently to remove the weight from the auxiliary section 27. The sheet may then be pulled from underneath the invalid and replaced. It also facilitates the changing of gowns and pajamas and bathing of the invalid.

Another important advantage resulting from the utilization of the lifting apparatus of this invention is the facilitating of the use of a bedpan by invalids who are unable to leave the bed or otherwise lift themselves. Assuming that the lift apparatus is in the normal repose position of FIGURE 1, the actuating means would be operated to first lift the invalid to the configuration shown in FIGURE 2. In this position, the invalid would be elevated above the mattress surface of the foot section M at the center of the bed and a bedpan may be readily placed beneath the invalid. Subsequent to the placement of the bedpan, the actuating means would be operated to position the head section 25 in a reclined sitting configuration shown in FIGURES 4 and 5. This will seat the invalid on the bedpan while supporting the upper section of his body in a reclined position. This operation is readily accomplished without the necessity of an attendant manually lifting or othewise manipulating the invalid's body.

Other advantageous operations and functions may be readily accomplished by means of the apparatus of this invention as will be readily apparent from the detailed description of the present embodiment thereof. The apparatus not only provides assistance to attendants in the handling of invalids but permits those invalids who are permitted light activity to assist themselves in attaining the desired position. An important advantage of the apparatus is economy in that an invalid may perform some of the functions for the care of himself and, therefore, further effects economy in reducing the number of attendants that are required for any of the intended operations and permits home care in many instances.

The remainder of the figures of the drawings illustrate in detail the construction and operation of the actuating means of this invention. Having reference to the drawings, the actuating means is seen to comprise a lever mechanism which is interconnected between a sub-frame assembly carried by the side rails R and the main and auixiliary sections 28 and 29 of the head section supporting platform on which the main and auxiliary mattress sections 26 and 27 are carried. Actuation of the lever mechanism is effected in the present embodiment by mechanical lift means driven by an electric motor which is provided with the necessary controls and which will be further described in detail. However, it will be understood that other motion-producing means may be utilized in effecting the operation and actuation of the lever mechanism and that the illustrated mechanism is presented as an example.

The lever mechanism is formed in identical left and right sections which are disposed in laterally spaced relationship with only the left section being illustrated in FIGURES 6-11. In the following detailed description, references to the lever mechanism will be considered to refer to both sections. The right section, which is not illustrated, includes the same components although the relative relationship is reversed for installation on the right side of the bed. FIGURES 6-10 are similar in that they are side elevational views of the actuating means, and specifically the lever mechanism, but illustrate the lever mechanism in the several operative positions. The lever mechanism has not been included in FIGURES 1-5 and the lift means has not been included in FIGURES 1-10 for clarity but it is to be understood that the lever mechanism lift means would be disposed in the related configuration in these figures.

The sub-frame assembly on which the lever mechanism is mounted comprises a pair of mounting rails 30 formed from elongated sections of structural angles which are disposed in spaced parallel relationship and extend longitudinally of the bed structure B. Each of the mounting rails 30 is adapted to engage a respective bed rail R with one flange thereof overlying the respective rail and thus providing the necessary vertical support. The vertical flanges of the mounting rails engage the inner opposed surfaces of the respective bed rails R to resist lateral movement. The length of the mounting rails 31 will be determined by the specific installation and, preferably, are of the same length as the head section 25 of the mattress. Extending transversely between and interconnecting with the mounting rails 30 are a pair of cross rails 31 which are structural angles. The cross rails 31 extend between the ends of the mounting rails and are rigidly secured thereto forming a rigid structure with the flanges providing convenient mounting surfaces for other components of the apparatus. Suspended beneath the plane of the side and cross rails 30 and 31 is a support platform formed by the two transversely disposed structural-angle rails 32 and 33 which are positioned at a point intermediate the cross rails 31. Both rails 32 and 33 are positioned with one flange in a mutual plane which is parallel to the side rails 30 and with the adjacent transversely extending edges spaced apart a given distance. Vertically disposed, structural angle struts 34 are attached to each rail 32 and 33 at the ends thereof and are also secured to the side rails 30 to support the rails 32 and 33 at the desired elevation. If desired, the sub-frame assembly may be detachably secured to the bed rails R by suitable fastening means (not shown), such as bolts.

Facilitating connection of the lever mechanism to the mattress-supporting platform sections 28 and 29 is a base frame structure comprising a pair of spaced-parallel, longitudinally-extending, structural angle members 35. These angle members 35 are positioned with one flange thereof in contacting engagement with the lower surface of the platform sections 28 and are secured thereto by a suitable fastening means, such as bolts 36. The platform sections 28 and 29, which may be formed from sheet metal plate, are articulately connected by a suitable hinge structure 37 with he platform section 29 adapted to be supported by but not secured rigidly to the structural angle members 35 forming the base frame structure. The members 35 are of a length to extend the entire length of the platform section 28 and to project a distance beneath the platform section 29. Each of the angle members 35 forming the base frame structure is preferably spaced inwardly of the respective mounting rail 30 a distance which is substantially equal to one-fourth the width of the platform section 28 to provide optimum weight distribution as can be best seen by reference to FIGURE 13. Extending transversely of the apparatus and beneath the platform section 29 is a U-shaped channel 38 which terminates at the angle members 35 and is rigidly secured thereto as by welding. The U-shaped channel 38 is positioned with the open side thereof facing toward the center of the bed structure and having the outer surface of the upper flange contiguous to the upper surfaces of the flanges of the angle members 35. Secured to and extending between the opposite ends of the angle members 35 is a structural angle brace 39 which further increases the rigidity of the base frame structure.

Vertical displacement of the head section 25 is effected by lifting means interposed between the sub-frame assembly and the base frame angle members 35 on which the sections 28 and 29 of the mattress-supporting platform rest (see FIGURES 11-15). This lifting means comprises a pair of screw jacks 40 with one jack being disposed in the space between the mounting rails 30 and adjacent member 35. The screw jacks 40 are of a type having a housing 41 mounted on the platform rails 32 and 33 and a screw 42 which is axially movable through the housing 41 in a vertical direction. Each of the screw jacks 40 includes a gear 43 which is mounted internally of the housing 41 and having an internally-threaded hub portion for engaging the screw 42. Driving the gear 43 is a worm gear having a drive shaft connection 44 extending outwardly from the housing 41. Rotation of the worm gear drive shaft 44 in a specific direction will effect displacement of the screws 42 in a desired direction. Power for driving the screw jacks 40 is supplied by an electric motor 45 which is mechanically coupled to the worm gear drive shafts 44 by the belts 46 and the pulleys 47 and 48. The electric drive motor 45 is also mounted on the platform rails 32 and 33 in an appropriate position for connection with both of the drive pulleys 48 of the screw jacks. A suitable electric control mechanism 49 is interconnected with the power circuits to the motor 45 for conveniently controlling the operation of the apparatus. This control mechanism 49 may include momentary contact pushbutton switches 50 and 51 for effecting the desired upward or downward movement of the apparatus through appropriate energization of the motor control circuits as is well known. This control mechanism 49 may be of the portable type which is connected to the circuits by a flexible cable 52 and may be placed within reach of the patient for operation of the apparatus by the patient. Although the present embodiment of the apparatus utilizes an electromechanical drive mechanism for effecting the vertical movements necessary for operation of the apparatus, it is to be understood that other mechanisms of well known type and operation may be utilized in place of the illustrated mechanism.

Connection of the screw jacks 40 to the base frame of the matress head section 25 is effected by an elongated lift bar 55 which extends transversely of the apparatus. The lift bar 55 is journaled in a bearing sleeve 56 attached to the upper end of each of the screws 42. A bearing plate 57 attached to the vertical flange of each of the base frame angle members 35 is also mounted on the lift bar 55 and completes the mechanical connection of the lift means to the mattress head section 25. Tubular spacer sleeves 58 are mounted on the lift bar 55 between the bearing sleeves 56 and the bearing plate 57 at each side of the apparatus to assure maintenance of the mattress head section 25 in the desired position.

Figure 21:
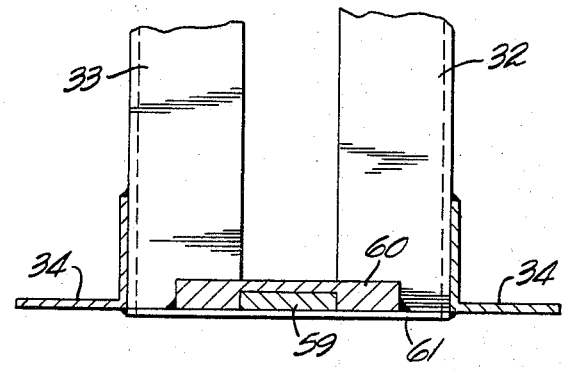
FIGURE 21 is a horizontal sectional view of the vertical guides taken along line 21—21 of FIGURE 6.

To further assure that movement of the lift bar 55 will be restricted to a vertical plane, suitable guide means are provided at each side of the apparatus for engagement with and control of the lift bar 55 through its vertically reciprocating movement. As can be best seen by reference to FIGURES 11 and 21, this guide means comprises a slide bar 59 secured at one end to the lift bar 55 and movable in a receiving channel of a guide plate 60. The guide plate 60 is rigidly attached to the inner surface of the vertical flange of the respective mounting rail 30 and projects a distance upwardly therefrom to a point immediately below the lift bar 55 in its lowermost position, as can be seen in FIGURES 6 and 12, to provide a suitably elongated guide. The lower end of the guide plate 60 preferably terminates at the upper surface of the platform rails 32 and 33. A retaining plate 61 is secured to the face of the guide plate 60 to assure that the slide bar 59 will be retained within the channel of the guide plate.

Securing the lift bar 55 against lateral displacement are a pair of collars 62 which are mounted on the lift bar on the outboard side of the slide bars 59. Each collar 62 is retained on the shaft or lift bar 55 by a set screw 63.

Control of the relative angular position of the mattress head section 25 through vertical displacement of the lift bar 55 is effected by first and second lever mechanisms and a cam mechanism which are duplicated on each side of the apparatus as previously indicated and may be best seen by reference to FIGURES 14 and 15. The cam mechanism incorporates means permitting selective operation of the mechanism and thereby controlling alternate movement of the first and second lever mechanisms. The first lever mechanism comprises a bell crank 66 journaled on the lift bar 55 and having a connecting link 67 pivotally connected to one end at 68 and an articulated linkage connected to the opposite end at 69. The articulated linkage includes the first and second arms 70 and 71 which are pivotally connected together by a spacer shaft 72 which also connects with the lever mechanism at the opposite side of the apparatus. The other end of the second arm 71 is connected to a pivot pin 73 which is carried by an L-shaped bracket 74. The L-shaped bracket 74 is rigidly secured to a vertical flange of the platform rail 32. One end of the connecting link 67 is also connected to a pivot pin 75 carried by its respective mounting bracket 76. The bracket 76 is also rigidly secured to the platform rails 32 and 33. It will thus be seen, with specific reference to FIGURE 15 and other side elevational views, that vertical movement of the lift bar 55 from the lowermost position will result in counterclockwise rotation of the bell crank 66 through the restraining action of the connecting link 67 thereby producing a relative swinging movement as to the first and second arms 70 and 71 and movement of the spacer shaft 72 which interconnects the arms 70 and 71 through an upwardly-directed, arcuate path.

The second lever mechanism comprises a cam lever 77 and connecting link 78 which are pivotally connected by a transversely-extending, spacer shaft 79 which also connects in a similar manner with the lever mechanism at the opposite side of the apparatus. The opposite end of the connecting link 78 is journaled on a support rod 80 extending transversely of the apparatus and which is carried by a pair of depending brackets 81 fastened to the vertical flanges of the base frame angle members 35. A pair of upstanding brackets 82 associated with the respective second lever mechanism are mounted on the platform rails 32 and 33 on the inboard sides of the screw jacks 40 (see FIGURES 12 and 14). Carried by the upstanding brackets 82 at the upper end thereof is a transversely-extending shaft 83 on which the cam levers 77 are journaled.

Journaled on each end of the spacer shaft 72 of the first lever mechanism is a cam roller 84 which is disposed in alignment with the cam lever 77. Integrally formed with the cam lever 77 along the lower surface is a cam surface 85 which is adapted to cooperatively engage the cam roller 84 throughout the normal travel as between the extreme positions of FIGURES 6-10. This cam surface 85 is designed to permit raising of the head-supporting end of the head section 25 at a predetermined rate in relationship to the vertical, upward displacement of the lift bar 55 and associated swinging movement of the lever mechanisms in a vertical plane and thus effect control over the swinging or tilting of the head section. As can be seen by reference to FIGURES 6 and 7, this ratio of movement is substantially constant as the head section 25 will be maintained in a horizontal position although elevated from its lowered, repose position of FIGURE 6. With further upward displacement of the lift bar 55 to the position as shown in FIGURE 8, the cam roller 84 will be caused to roll against a portion of the cam surface 85 which will result in a relatively faster rate of elevation of the head-supporting end of the head section. This will result in a counterclockwise rotation of the head section, as viewed in the several figures, or tilting to a recline position. This rotation of the head section 25 will proceed with further elevation of the lift bar 55 to a maximum degree of inclination, as shown in FIGURE 10.

The second lever mechanism comprising the lever arm 77 and connecting link 78 is not restrained in its upward movement by the first lever mechanism comprising the first and second arms 70 and 71. Since the cam lever 77 merely rests on the cam roller 84, the head section 25 is free to rotate in a counterclockwise direction without movement of the first lever mechanism. This relatively free rotation of the head section is undesirable in one mode of operation of the apparatus and would inadvertently result where the weight of the invalid is to the left of the lift arm 55 or predominantly carried by the auxiliary section 27 of the mattress head section 25. Such undesired movement of the head section 25 is prevented by selective operation of the cam mechanism. This cam mechanism is designed to be selectively operated and restrict the counterclockwise, rotational movement of the head section 25 to the same rate as the first and second lever mechanisms cooperatively function to elevate the head-supporting end of the head section 25. Thus, the cam mechanism in cooperation with the first and second lever mechanisms will maintain the head section 25 in a desired position and will cooperate to stabilize the head section in a relatively fixed position.

Having reference, specifically, to FIGURE 15, this cam mechanism is seen to comprise a cam lever 86, a connecting link 87 and a roller-type cam follower 88. The cam lever 86 is journaled on the shaft 83 for swinging movement in a vertical plane and is formed at the opposite end with a cam surface 86a extending from the point 86b to 86c. One end of the connecting link 87 is journaled on the lift bar 55 while the opposite end is pivotally connected to the cam lever 86 by a pivot pin 89 located at a point intermediate the shaft connection 83 and the cam surface 86a. Each of the cam followers 88 is mounted on a respective supporting structure 90 which is carried by the U-shaped channel 38 of the base frame supporting the mattress head section 25.

When it is desired to restrict the rotational movement of the head section 25, the supporting structure 90 carrying the cam followers 88 is actuated to place the cam followers in operative relationship to the respective cam levers 86. With the cam followers 88 in engagement with the cam levers 86, upward vertical displacement of the lift bar 55 will result in upward swinging movement of the cam lever 86, to maintain the cam surface 86a at a predetermined position, in relationship to the operation of the first and second lever mechanisms. This relationship is such that during movement of the lift bar 55 from the lowest repose position, as shown in FIGURE 6, to an elevated position, as shown in FIGURE 7, the head section 25 will be maintained and rigidly supported in a horizontal position and resist rotational movement due to the weight of the invalid which may be unsymmetrically distributed relative to the lift bar. Through continued movement of the lift bar 55 from the poistion shown in FIGURE 7 to that shown in FIGURE 10, the cam mechanism will operate and function to continue support of the head section 25, as previously described, to resist inadvertent, counterclockwise rotation of the head section due to unbalanced distribution of the invalid's weight.

If it is desired that the head section 25 be merely inclined relative to the mattress foot section M without the initial, vertical displacement of the head section 25 in a horizontal plane, as shown in FIGURES 2 and 7, the supporting structure 90 of the cam followers 88 would be operated to prevent engagement of the cam followers with the cam levers 86. In this configuration, the weight of the invalid, which is predominantly centered relative to the head section 25 at a point which is to the left of the lift bar 55, as shown in the drawings, or toward the center of the bed and will tend to cause the head section 25 to rotate about the lift bar 55 in a counterclockwise direction. As previously described, this counterclockwise direction is unrestricted by the first and second lever mechanisms comprising the arms 70, 71, the lever arm 77, and the connecting link 78. Counterclockwise rotation of the head section 25 is restricted in this mode of operation by extensions of the pins forming the pivots 68 of the bell crank 66 and connecting link 67. These extensions of the pivot pins 68 will engage the lower edge of the angle members 35 forming the base frame structure.

Figure 19:
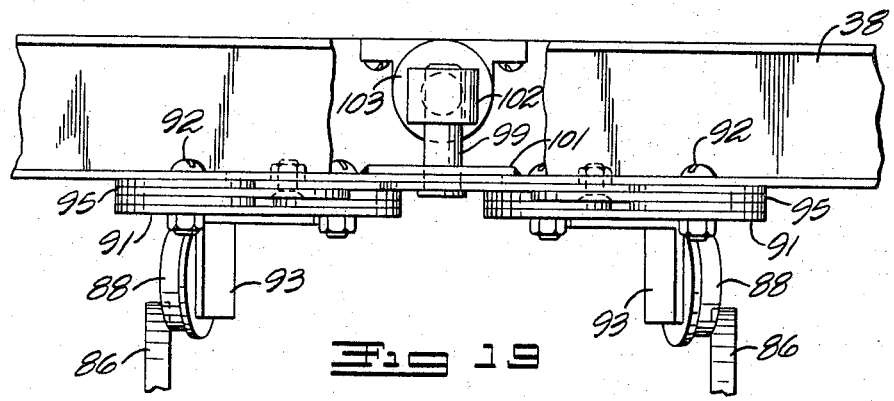
FIGURE 19 is an elevational view of the cam follower mechanism taken along line 19—19 of FIGURE 18.
Figure 20:
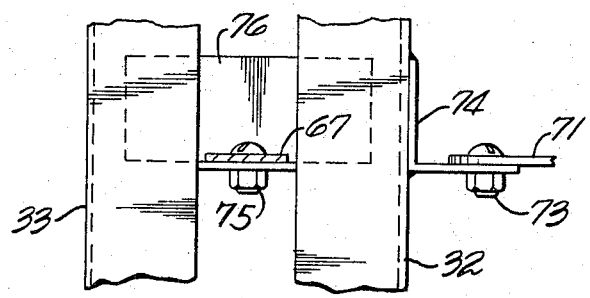
FIGURE 20 is a fragmentary, horizontal sectional view taken along line 20—20 of FIGURE 15.

The supporting structure 90 for each cam follower 88 comprises an L-shaped lever arm 91 which is pivotally connected to the lower flange of the U-shaped channel 38 for rotation in a plane parallel to the bottom surface of the head mattress section. A bolt 92 extending through the lower flange of the U-shaped channel 38 forms a pivot pin for each of the arms 91. Secured to the lower surface of the lever arm 91 is an L-shaped bracket 93 having a flange thereof projecting downwardly on which the cam follower 88 is journaled by a stub shaft 94. As can be best seen by reference to FIGURES 11, 16 and 19, swinging movement of the lever arm 91 from the position shown in FIGURE 11 to that shown in FIGURE 16 will disengage the cam followers 88 from the respective cam surfaces 86a.

Actuation of the supporting structure 90 is effected by an electric solenoid-actuated toggle mechanism. The toggle mechanism comprises an L-shaped lever arm 95 which is secured at the shorter end for rotational movement on the pivot bolt 92 and a bell crank 96. The bell crank 96 is pivotally connected at the end of the shorter arm to the extreme end of the lever arm 91 by a pivot pin 97. A second pivot pin 98 connects the relatively shorter arm of the lever 95 to the juncture of the two arms of the bell crank 96. The longer arm of the bell crank 96 is secured to a slider 99 which is disposed for sliding movement in a slot 100 formed in a guide plate 101 which is secured to the U-shaped channel 38. The slot 100 and guide plate 101 are arranged to restrict the sliding movement of the slider 99 to a plane which is perpendicular to the U-shaped channel 38. Connected to the slider 99 is the plunger 102 of an electrically operated solenoid 103. The solenoid 103 is secured to the platform section 28 of the head section 25 and is, therefore, capable of effecting relative movement of the slider 99 relative to the U-shaped channel 38. Retraction of the plunger 102 from the position shown in FIGURE 16 will cause the toggle mechanism to operate to the position shown in FIGURE 11 where the cam followers 88 will be disposed in engagement with the surfaces 86a of the cam levers 86. With the plunger 102 retracted as shown in FIGURE 11, the toggle mechanism will be in a configuration such that lateral forces exerted on the cam followers 88 will be resisted and prevent disengagement. The toggle mechanism thus forms a latch which secures the cam followers 88 in either of the desired positions. Control of operation of the solenoid 103 may be conveniently effected by pushbutton switches 104 and 105 which are mounted in the control mechanism 49 for convenience of operation. Each of the switches 104 and 105 is connected in circuit with the double-acting type solenoid 103, to effect operation thereof in the desired direction by connecting the appropriate coils with a suitable source of electric power.

During the course of movement of the head section 25 from the repose position shown in FIGURE 6 to the fully inclined position of FIGURE 10, the auxiliary mattress section 27 will be caused to bear against the mattress foot section M. This will result in considerable crushing of the contacting mattress sections. Through splitting of the head section 25 into the main and auxiliary sections 26 and 27 and providing a hinge structure 37, this crushing effect is further distributed between the contacting portions of the main and auxiliary sections 26 and 27. In addition to distributing the crushing action of the mattresses during movement of the head section 25 to a comfortably inclined position, it is desirable that the upper corner 27a of the auxiliary section 27 be maintained at substantially the same elevation as the upper surface of the mattress foot section M. This is accomplished by means of a pair of cams 109 having a surface which is formed to engage a respective cam block 110 which is secured to the lower surface of the platform section 29. Each cam 109 is pivotally supported at 111 by a bracket 112 secured to the cross rail 31. Formed with the cam 109 is a lever arm 113 which is pivotally connected to a connecting link 114 at 115 by a pivot pin. An opposite end of the connecting link 114 is journaled on the lift bar 55 and vertical displacement of the lift bar will effect rotational movement of the cam 109. During initial movement of the lift bar 55 from the position of FIGURE 6 to an intermediate, inclined position in either mode of operation of the lever and cam mechanisms, the platform section 29 will be supported on the angle members 35 and the U-shaped channel 38 forming the base frame of the head section. However, after reaching this intermediate position, as in FIGURE 9, the cam block 110 will be engaged by the cam 109 and supported thereafter. Subsequent upward movement of the lift bar 55 resulting in further inclination of the angle members 35 will result in relative angular displacement of the platform section 39 relative to the platform section 28, as is best shown in FIGURE 10. The cams 109 are designed to maintain the upper corner 27a of the auxiliary mattress section 27 at the desired elevation and distribute the crushing action.

The apparatus, when in the repose position of FIGURE 6, will maintain the head section 25 in a fixed, horizontally-disposed position. The lift bar 55 will provide the necessary vertical support while the lever mechanisms and cam mechanisms will provide the necessary stability. However, to increase the stability of the head section 25, a pair of depending struts 117 are secured to respective angular members 35 of the base frame and are of a length to engage the cross rail 31 when the apparatus is in the repose position of FIGURE 6.

As previously indicated, the bed-lift apparatus of this invention may be selectively operated in either of two modes of operation. In the first mode of operation, the apparatus is operable to effect vertical lifting of the upper body portion of the invalid from a horizontally disposed position (FIGURE 1) to a relatively elevated, horizontally disposed position (FIGURE 2). This is accomplished by assuring that the toggle mechanism which maintains the cam followers 88 in a desired position has been actuated to position the cam followers in engagement with a respective cam 86 and then actuating the control switch 50 for energization of the motor 45. Momentarily depressing the "LOCK" pushbutton switch 104 will energize the solenoid 103 and assure retraction of the plunger 102 which latches the toggle mechanism in the desired position. Maintaining the switch 50 in a depressed configuration will maintain an electric circuit to the motor 45 for its continued operation in elevating the lift bar 55. As the lift bar 55 is elevated, the first and second lever mechanisms and the cam mechanism will be actuated to maintain the head section 25 in a horizontal position. When the head section 25 reaches its maximum vertical elevation in a horizontal configuration (FIGURE 2), the pushbutton switch 50 is released thereby interrupting the electric circuit and deenergizing the motor 45 and the lift bar 55 will be maintained in this elevated position through internal friction forces of the lift means. Continued energization of the motor 45 through maintenance of the switch 50 in a closed configuration will result in continued elevation of the lift bar 55 and operation of the first and second lever mechanisms and cam mechanisms to place the head section 25 in an inclined position as in FIGURE 3. In the intermediate inclined position of FIGURE 3, both the main and auxiliary sections are maintained in the same plane although relatively inclined. Upon further operation of the motor 45 of the lift means to a maximum, the head section 25 will be displaced as shown in FIGURE 5. During movement of the head section 25 from the intermediate inclined configuration of FIGURE 3 to the maximum inclined configuration of FIGURE 5, the cams 109 will engage the cam blocks 110 carried by the auxiliary platform section 29 and effect angular displacement of this section relative to the main platform section 28. The auxiliary mattress section 27 will thus be angularly displaced relative to the main section 26 with the consequent result that the mattress crushing action will be distributed and the leading corner 27a of the auxiliary mattress section 27 will be at substantially the same elevation as the adjacent upper surface of the foot mattress section M.

After reaching the maximum inclined position of FIGURE 5, the pushbutton switch 51 may be depressed and complete an electric circuit to the motor 45 resulting in reversal of operation for returning the apparatus to the repose position of FIGURE 1. The head section 25, during this reverse operation, will pass through the intermediate inclined position of FIGURE 3 and then through the elevated horizontal position of FIGURE 2 before reaching the lowered repose position of FIGURE 1.

The operation of the apparatus may be stopped at any point during the raising or lowering of the head section 25, in accordance with this first mode of operation, and the head section will be rigidly maintained in this position. If desired, the direction of operation may be reversed at any time through appropriate operation of the switches 50 and 51.

In the second mode of operation, the toggle mechanism is actuated to maintain the cam followers 88 in disengaged relationship to the respective cams 86. Disengagement is effected by depressing the pushbutton switch 105 to energize the solenoid 103 for extension of the plunger 102 and swinging the cam followers 88 to the position as shown in FIGURE 16. Operation of the lift means to elevate the lift bar 55 will then merely incline the head section 25 with the degree of inclination being controlled by the extensions of the pivot pins 68 since the weight of the invalid will tend to cause counterclockwise rotation of the head section. Prior to the time that the cam blocks 110 of the auxiliary mattress section 27 engage the cam 109, the auxiliary and main sections, 27 and 26, will be maintained in a flat plane although inclined as in FIGURE 9. Further elevation of the lift bar 55 will place the head section 25 in substantially the configuration of FIGURE 10 which is again the maximum inclined position. Depressing the pushbutton switch 51 will reverse the operation of the lift means and return the head section 25 to the lowered horizontal configuration of FIGURE 1 in the same manner as it was upwardly inclined. Operation of the apparatus may be stopped at any desired point in the second mode of operation by releasing the appropriate switch 50 or 51. Also, if so desired, the invalid may shift his weight at any point of inclination to cause the head section 25 to assume a relatively less inclined position through clockwise rotation with this movement being restricted by engagement of the cam surface 85 with the cam roller 84 of the first and second lever mechanisms.

An additional advantage of the apparatus is that the mode of operation may be changed at any time irrespective of the position. This is accomplished by merely actuating the appropriate pushbutton switch 104 or 105, assuming that the head section 25 is inclined to permit engagement of the cam followers 88 with the respective cams 86.

The several objectives and advantages of the present invention are readily apparent from the foregoing detailed description of an embodiment thereof. The apparatus permits advantageous lifting of an invalid to a desired position for either comfort or care. Personal care of the invalid in bathing, changing of bed clothes, and utilization of a bedpan, for example, may be accomplished with greater facility. The apparatus provides the necessary motive force required for lifting or otherwise moving the invalid thereby reducing the number of attendants that may be required and increasing the practicality of home care in many cases where only an elderly person is available for attendant duties. The apparatus may be advantageously and easily operated by the invalid which will facilitate self-help. Utilization of lift-apparatus embodying this invention provides safety in lifting of an invalid and permits servicing of fracture and heart patents with the least possible movement to the body. Movement may be precisely controlled thereby greatly reducing the possibility of an invalid's fear of movement. A bed for invalids which is capable of providing the desired lifting function may be economically constructed through utilization of the lift apparatus of this invention.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

I claim:

1. An invalid bed-lift apparatus comprising a sub-frame assembly adapted to be maintained in a relatively fixed position, an elongated mattress section for supporting an invalid thereon disposed in overlying relationship to said sub-frame assembly, and means interposed between and operatively connected with said sub-frame assembly and said mattress section for selective displacement of said mattress section between a horizontally disposed position and a relatively elevated, horizontally disposed position or a relatively inclined position, said means includes lift means carried by said sub-frame assembly and connected to said mattress section at a point intermediate the ends thereof forming a fulcrum point about which said mattress section may rotate in a vertical plane and selectively operable for displacement of said fulcrum point in a vertical plane, and lever means interconnected between said sub-frame assembly and said mattress section and lift means for controlling the rotation of said mattress section about said fulcrum point in predetermined relationship to vertical displacement of said fulcrum point, said lever means being operable to maintain said mattress section horizontally disposed during vertical displacement of said fulcrum point by said lift means between a first position and a relatively elevated, second position, and rotating said mattress section to an inclined position during vertical displacement of said fulcrum point by said lift means between said second position and a third, further elevated position.

2. A bed-lift apparatus according to claim 1 wherein said means includes cam means interconnected between said sub-frame assembly and said mattress section and lift means and being cooperatively operable with said lever means in controlling rotational movement of said mattress section about said fulcrum point.

3. A bed-lift apparatus according to claim 2 wherein said cam means is selectively operable to an inoperative position and said lever means is provided with stop means cooperatively engageable with said mattress section for limiting rotational movement of said mattress section in predetermined relationship to vertical displacement of said fulcrum point.

4. A bed-lift apparatus according to claim 1 wherein said mattress section is formed from a main section carried by said lift means and an auxiliary section articulately connected to said main section for relative swinging movement about an axis disposed transversely to said mattress section, and the apparatus includes cam means carried by said sub-frame assembly and cooperatively engageable with said auxiliary section for maintaining the end edge of said auxiliary section at a relatively constant elevation during movement of said mattress section to an inclined position.

5. A bed-lift apparatus according to claim 1 wherein said lift means comprises an elongated bar extending transversely of and connected with said mattress section, a lifting mechanism carried by said sub-frame assembly having a movable element connected with said elongated bar and which is selectively movable in a vertical plane for effecting vertical displacement of said fulcrum point.

6. A bed-lift apparatus according to claim 5 wherein said lifting mechanism comprises a screw-jack having a housing mounted on said sub-frame assembly and said movable elements comprise a screw carried by said housing and connected at one end to said elongated bar and electrically operated drive means mechanically coupled with said screw for effecting movement thereof.

7. A bed-lift apparatus according to claim 1 wherein said lever means includes a first lever mechanism connected between said sub-frame assembly and said lift means, and a second lever mechanism connected between said sub-frame assembly and said mattress section, said first and second lever mechanisms being provided with cooperatively engageable cam means with said first lever mechanism being operable in response to actuation of said lift means for effecting operation of said second lever mechanism to control the angular position of said mattress section, said cooperatively engageable cam means effecting control over the relative rotational movement of said mattress section.

8. An invalid bed-lift apparatus comprising a sub-frame assembly adapted to be maintained in a relatively fixed position, an elongated mattress section having a surface for supporting an invalid thereon disposed in overlying relationship to said sub-frame assembly, and means interposed between and operatively connected with said sub-frame assembly and said mattress section for selective displacement of said mattress section between a horizontally disposed position and a relatively inclined position with one transversely extending edge of said mattress section surface lying in the same plane as when in said horizontally disposed position, said means being operative during movement of said mattress section between said horizontally disposed and said relatively inclined positions to displace said mattress to an intermediate position wherein the surface of said mattress section is relatively elevated to the surface of said mattress section when in said horizontally disposed position.

9. A bed-lift apparatus according to claim 8 wherein said means is operative to maintain said mattress horizontally disposed between said horizontally disposed position and a relatively elevated position.

10. A bed-lift apparatus according to claim 8 wherein said means includes lift means carried by said sub-frame assembly and having a vertically movable element pivotally connected to said mattress section at a point intermediate the ends thereof permitting relative rotation of said mattress section in a vertical plane about an axis disposed transversely to said mattress section, and lever means interconnected between said sub-frame assembly and said mattress section and the movable element of said lift means for controlling relative rotational movement of said mattress section in predetermined relationship to vertical displacement of the movable element of said lift means.

11. A bed-lift apparatus according to claim 10 wherein said means includes cam means interconnected between said sub-frame assembly and said mattress section and the movable element of said lift means, said cam means operable in cooperation with said lever means to control the rotational movement of said mattress section.

12. A bed-lift apparatus according to claim 11 wherein said cam means may be selectively rendered inoperative.

13. A bed-lift apparatus according to claim 10 wherein said mattress section is formed from a main section connected to said lift means and an auxiliary section articulately connected to said main section for swinging movement relative thereto about a transversely extending axis, and said means includes additional cam means connected with the movable element of said lift means and cooperatively engageable with said auxiliary mattress section for controlling the relative swinging movement thereof in predetermined relationship to vertical displacement of said lift means movable element.

14. A bed-lift apparatus according to claim 10 wherein said lever means includes a first lever mechanism connected between said sub-frame assembly and the movable element of said lift means, and a second lever mechanism connected between said sub-frame assembly and said mattress section, said first and second lever mechanisms being provided with cooperatively engageable cam means with said first lever mechanism being operable in response to vertical displacement of said lift means movable element to effect operation of said second lever mechanism in controlling rotational movement of said mattress section.

References Cited by the Examiner

UNITED STATES PATENTS

| 2,538,993 | 1/1951 | Travis | 5—66 |
| 2,670,476 | 3/1954 | Travis | 5—66 |
| 2,917,753 | 12/1959 | Portis et al. | 5—66 |
| 3,201,806 | 8/1965 | Hutt | 5—62 |

CASMIR A. NUNBERG, *Primary Examiner*.